July 16, 1968 M. W. HAUN 3,392,452
COORDINATE MEASURING DEVICE
Filed April 7, 1965 3 Sheets-Sheet 1
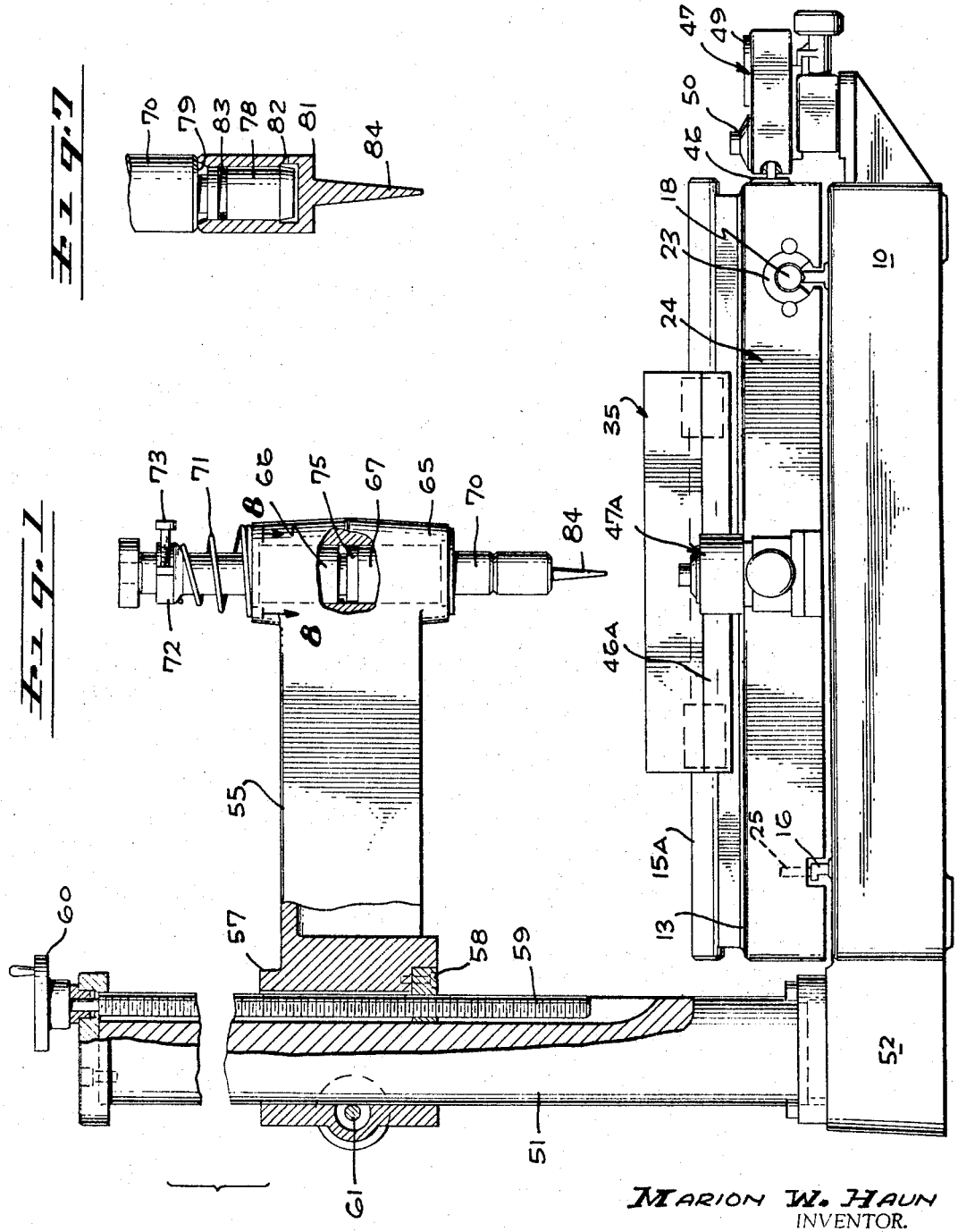
MARION W. HAUN
INVENTOR.
BY Warren T. Jessup
ATTORNEY

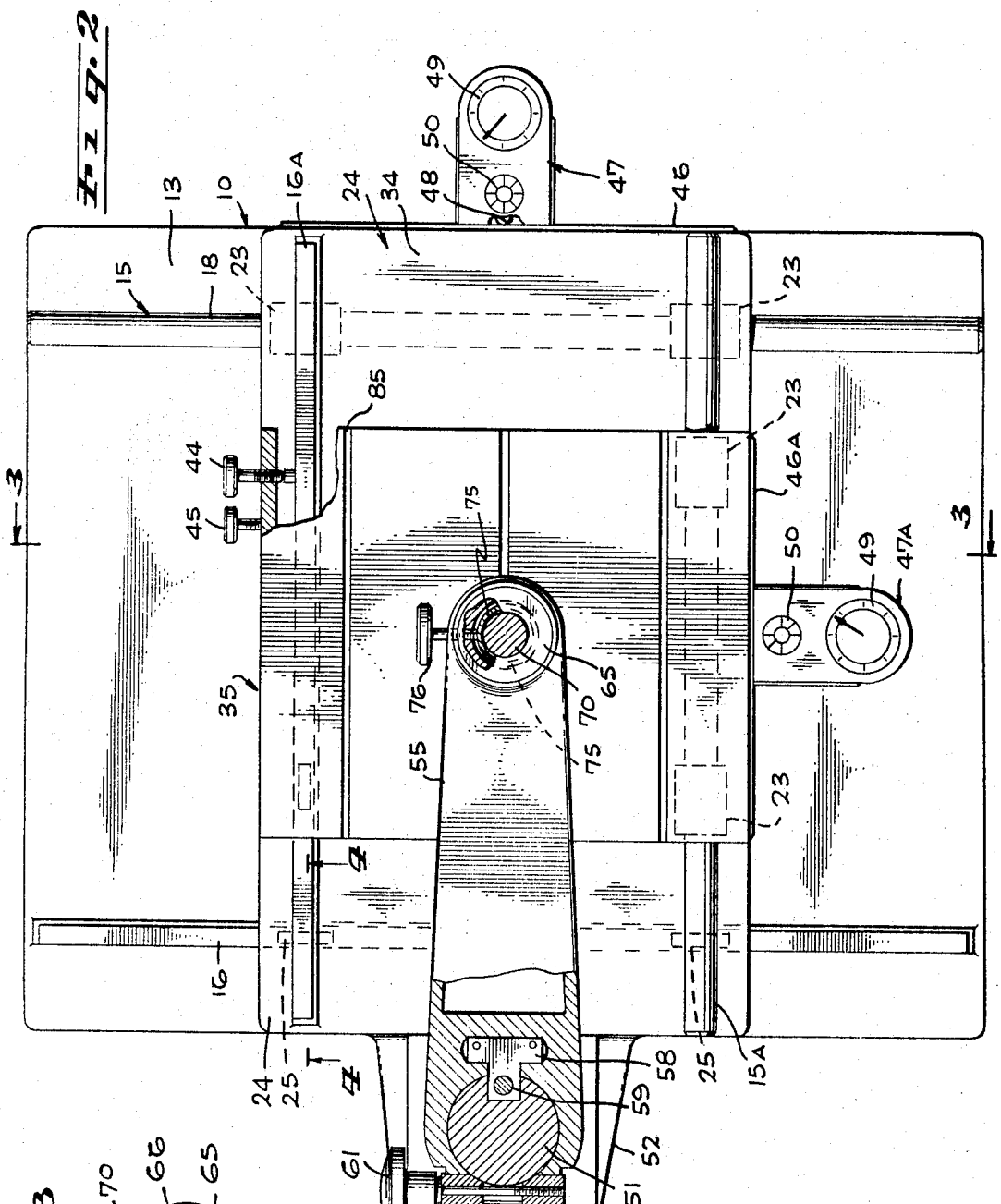

July 16, 1968    M. W. HAUN    3,392,452
COORDINATE MEASURING DEVICE
Filed April 7, 1965    3 Sheets-Sheet 3
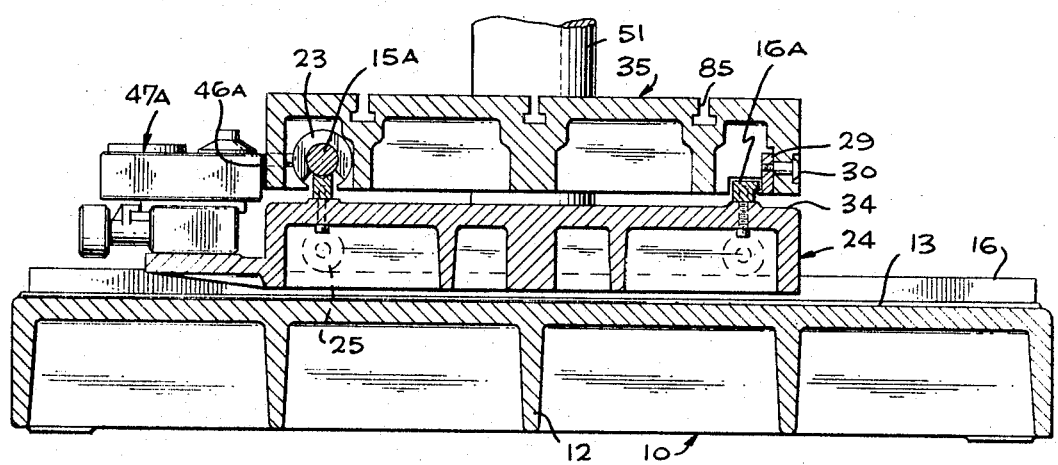
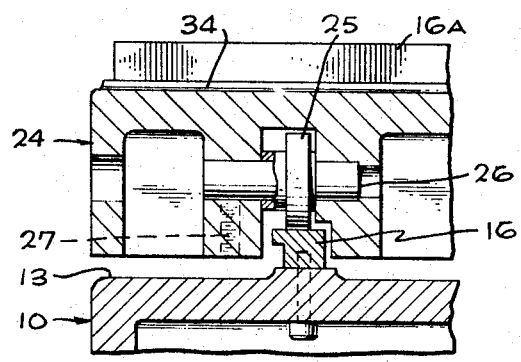
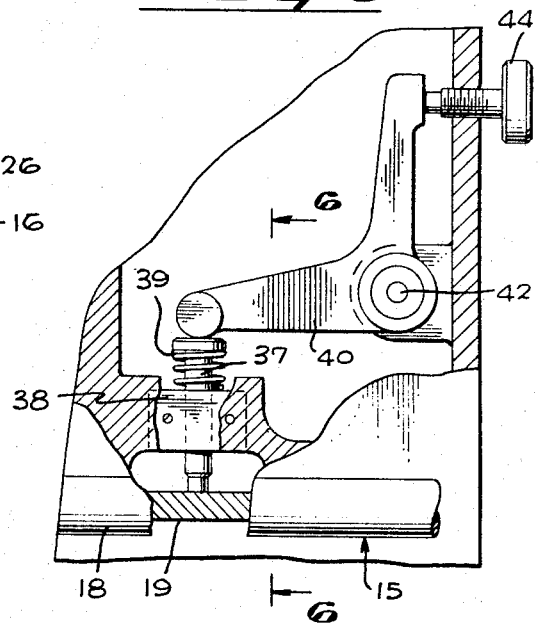
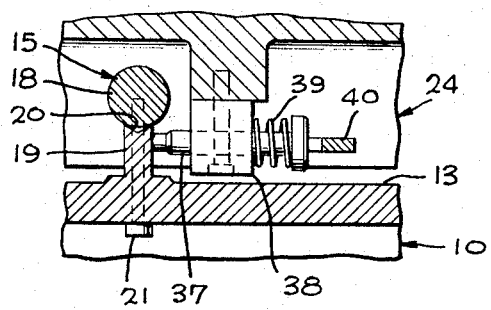
MARION W. HAUN
INVENTOR.
BY
Warren T. Jessup
ATTORNEY United States Patent Office 3,392,452
Patented July 16, 1968

3,392,452
COORDINATE MEASURING DEVICE
Marion W. Haun, Torrance, Calif., assignor, by mesne assignments, to The Rucker Company, a corporation of California
Filed Apr. 7, 1965, Ser. No. 446,366
7 Claims. (Cl. 33—174)

ABSTRACT OF THE DISCLOSURE

A precision measuring instrument is described which includes a compound table assembly for providing movements of a workpiece to any coordinate position with respect to a predetermined reference, and which also includes a probe or stylus which provides an index point, and which permits the workpiece on the table to be positioned and repositioned with respect to the index point with great accuracy the probe includes a female interchangeable point the cylindrical portion of which is fitted over a male shaft, the cylindrical portion has an air vent to prevent air entrapment from frustrating the effort to fit said portion over the shaft, and a pliant O-ring is carried by the shaft for functional engagement with said portion of the point.

---

This invention concerns precision measuring equipment as particularly related to the industrial engineering and manufacturing disciplines.

Both in engineering and in precision manufacture of individual parts, it is necessary to determine relationships both as to distances and direction with extreme accuracy. That is, in order to locate one feature of a structure with respect to another, the position of that feature from a reference index may be required to be established from engineering specifications. On the other hand, it is sometimes necessary to determine the relationship of actual physical features on a workpiece, and for this purpose, accurate measurement is required.

The normal measuring techniques generally involve complex and time-consuming procedural steps. Accordingly, it is the primary object of this invention to provide a coordinate measuring device which will enable a workpiece to be positioned and repositioned with respect to an index point with great accuracy.

It is another object of this invention to provide a measuring device having a compound-action table assembly, providing movement along coordinate axes, and to provide instruments to determine the distance of movement of each table with respect to the other, or to a fixed base.

It is a further object of this invention to provide a measuring device having a compound table in order that the magnitude of a system of two or more magnitudes may be measured instantly and the positional relationship recorded and preserved for the accurate return of a workpiece mounted on the device to a given starting position, or any coordinate relationship, thereto.

In accordance with these and other objects which will become apparent hereinafter, a preferred form of the present invention is disclosed in the accompanying drawings wherein:

FIGURE 1 is a side elevational view of the preferred embodiment of the present invention;

FIGURE 2 is a top-plan view of the device of FIGURE 1, with a portion of the vertical post removed to reveal interior detail;

FIGURE 3 is a section taken along the line 3—3 of FIGURE 2;

FIGURE 4 is a section, enlarged, through a portion of the table as taken along line 4—4 of FIGURE 2;

FIGURE 5 is a detailed top view illustration of a table lock device;

FIGURE 6 is a section taken along line 6—6 of FIGURE 5;

FIGURE 7 is a detailed section through the probe device shown in FIGURE 1; and

FIGURE 8 is a partial section taken along line 8—8 of FIGURE 1.

Referring now to the drawings, in FIGURES 1, 2, and 3 a base 10 is illustrated in side, top, and section views respectively. As best seen in FIGURE 3, the base is preferably cast to provide integral ribs 12 and, thereby, produce a rigid structure having a planar tabletop 13.

On the top 13, are first and second spaced parallel rails 15 and 16. These rails 15 and 16 are considerably different from one another in form and function, although they cooperate to produce a desired end effect. These rails extend laterally across the top 13, as best seen in FIGURE 2.

The rail 15 is composed of an anchor rail rod 18 and a standard rail 19. As best seen in FIGURE 6 standard rail 19 has a bifurcated top 20 in order to present two spaced longitudinal supporting edges. The anchor rail rod 18 then seats upon the edges of the rail 19. Thus, a perfectly true seat is provided with a minimum of machining accuracy.

A series of bolts 21 extend upwardly through the tabletop 13 and the web of the rail 19, and thread into the rod 18. Thereby, the entire rail 15 is pulled tightly against the top.

A plurality of bearing trucks 23 are mounted on the anchor rail rod 18. Each bearing truck 23 is in the nature of a commercial grade ball bushing readily available as a standard item of commerce. Ball bushings have internal ball races and provide relative mobility of the bearing truck and the rod 18. By reason of its encompassing nature, the bushing holds the rod 18 tightly confined inside the bearing truck 23, regardless of which member is considered to be the movable member.

A table carriage 24 is mounted upon the bearing trucks 23 by securing the housing of the bearing trucks internally of the table carriage 24, and by supporting the opposite end of the table on the rail 16 by means of a bearing roller 25. Bearing roller 25 is best illustrated in FIGURE 4 of the drawings. The provision of the bearing truck 23 confined within the table 24, provides truck means having interlocking surface means with the anchor rail rod 18 for movement of the table solely in the path established by the rod 18 and its standard rail 19.

The bearing roller 25 has an axle 26 which is held, as illustrated in FIGURE 4, by means of a set screw 27. The bearing roller 25 is then free to roll along the top surface of rail 16, but can shift laterally as dictated by expansion and contraction of the table 24 under temperature variation conditions. Thus, the forward edge of the table 24 will be confined to a given path, although the expansion and contraction of the metal between the center of the bearing truck 23 and forward edge of table 24 will literally produce an infinitesimal amount of expansion and contraction. Any substantial change, however, will be confined to the edge opposite truck 23, beyond the area of influence.

Table 24 is also cast and provided with interior ribs as described in connection with the base 10, and provides a flat tabletop 34. On this top 34 are two rails 15A and 16A, which are contructed and spaced substantially as defined with respect to the rails 15 and 16. However, the direction of the rails 15A and 16A are transverse to the direction of the rails 15 and 16. Hence, a cross table carriage 35, mounted on the rails 15A and 16A by bearing trucks and bearing rollers, will move with the same accuracy and ease as defined with respect to the table carriage 24.

In order to prevent the cross table carriage 35 lifting off the table carriage 24, a hook rod 29, as illustrated best in FIGURE 3, is empolyed to interlock with the rail 16a. The rail 16a has an undercut, producing a ledge under which the hook of the hook rod 29 will extend and thus prevent vertical lifting of the cross table 35 beyond the limits established by the positional relationship of the hook rod and rail. A screw 30 is employed to attach rods 29 to the interior of the cross table 35. A similar arrangement, not illustrated, exists in which a hook rod, similar to the hook rod 29, is employed to interlock with the rail 16, in order to prevent table carriage 24 from lifting off base 10.

There are instances in which apparatus may be best employed by preventing one or both of the tables from freedom of movement. In such instances, either table may be locked by means of the locking mechanism, best illustrated in FIGURES 5 and 6. As illustrated, a position locking pin 37 is mounted in a guide bearing 38. Bearing 38 establishes an extra path of movement for pin 37 in the direction of the lateral side of the support rail 19. Thus, bearing 38 is carried by a table at a position adjacent the support rail for that table, and the pin 37 may be pressed against the web of the rail to produce a brake and locking device.

A spring 39 urges the pin 37 away from the rail, and a rocker arm 40 is employed to force the pin into engagement with the rail. Rocker arm 40 is provided with a pivot mount 42 and an external manually-operable pressure screw 44. As screw 44 is threaded inwardly through the skirt of the table, the rocker arm 40 is caused to force the position lock pin 37 against the rail and prevent further movement of the table with respect to the rail. A direct-action lock screw 45 is employed on the top table. Thus, the hand controls of the position locking devices are located adjacent one another.

As thus far described, this invention provides a unique physical construction which provides an accurately-reproducible repositioning of the top of cross table 35 under substantially any circumstances. That is, the two tables cooperate with extreme accuracy to provide coordinate movement in order that a workpiece mounted on the cross table carriage 35 may be measured with extreme accuracy by moving the table through increments of distance corresponding to like increments established in the engineering specification for the workpiece. That is, if a particular feature on a workpiece is specified to be at a given location with respect to the X and Y ordinates of a graph, then the coordinate tables of this invention will enable the accurate measurement of that workpiece to establish the actual location of the feature and thus to compare it with the specification for its location.

In order to make the invention exceptionally attractive for the reduction of time spent in making such coordinate measurements, each table 24 and 35 is equipped with an accuate face track, indicated by the refernce character 46 on table 24, and 46A on table 35. Referring only to FIGURE 1 for illustration purposes, the track 46 will there be seen to be a raised boss which is capable of being accurately machined to produce a flat and true surface. A travel gauge 47 (47A with respect to the table 35) is then carried by the structure which supports the particular table whose measurement is being gauged. In FIGURE 1, a bracket from the base 10 supports the gauge 47.

Gauge 47 is a standard item of commerce which is employed to measure movement with respect to the gauge with a high degree of accuracy. A wheel 48, carried by gauge 47, is pressed against the accurate surface of track 46 by means of a spring having a thrust of about forty pounds. This pressure prevents the wheel from slipping and thus causes an accurate movement of the wheel 48 corresponding to the actual movement of the corresponding table. Gauge 47 has dials 49 and 50 for reading major amounts of movement, and vernier portions of the larger scale. The dials may be set to zero at any given table location, and, hence, any movement thereafter can be measured, and, furthermore, the table can be returned to the precise location from which it started.

Although this invention is not limited to service as a coordinate measuring device, it is illustrated in that form as a showing of a preferred embodiment. Hence, in order to make the accurate movement of the two tables meaningful, a reference is needed from which measurements may be taken. Hence, post 51 is mounted upon a base extension 52 from the base 10, and, therefore, post 51 maintains a rigidly-fixed upright position with respect to the table movement.

An overarm 55 is carried by means of a vertically-slidable guide sleeve 57. The guide sleeve 57 is closely fitted, but readily movable upon the vertically-extending post 51, and, therefore, the post and overarm provide a reference point with respect to the top of the composite table.

A threaded plate 58 is secured to the overarm 55 and is engaged by screw 59, carried in the post 51, and rotatably driven by handle 60. Hence, operation of handle 60 will raise and lower the overarm 55 to any desired position. Clamp 61 is provided to hold the overarm 55 in a selected elevational position.

Head 65 is carried on the end of arm 55 and provides two vertically-aligned bearing guides 66 and 67. In these aligned bearing guides, probe rod 70 is able to fit for a close accurate vertical movement. Spring 71 is mounted on the top of the head 65 encompassng the probe rod 70 and is formed to abut collar 72. Collar 72 is vertically adjustable with respect to the rod 70 and is held in a selected vertical position by means of a set screw 73. Hence, the degree of force applied to the rod 70 by the spring 71 may be selected as desired. By this arrangement, the rod 70 may be pressed downwardly through the aligned bearing guides 66 and 67 and will return to a rest position when pressure is released.

Extreme accuracy of all parts is the central theme of construction of a precision measuring device such as the illustrated embodiment of the invention. Hence, the bearing guides 66 and 67 are high-quality, close-fitting guide bearings, and the external surface of the probe rod 70 is carefully finished to fit with a high degree of accuracy within the bearing guides. Hence, the surface of the rod 70 is precious and must not be marked by a clamping device. Nevertheless, it is necessary to hold the probe rod 70 in a lowered position for extended periods of time while measurements are being made.

For this purpose, a collar 75 is positioned between the ends of the bearing guides 66 and 67. Collar 75 is free to move to laterally within the head 65 and is provided with an internal bore of greater diameter than the rod 70. A set screw 76 is threaded through the side of head 65 and is directed to abut the collar 75. This relationship is best illustrated in FIGURE 2 of the drawings. A few thousandths of an inch will suffice for sufficient clearance. Then, tightening of the set screw 76 against the side of the collar 75 will cause the collar to move off center and press against the surface of the rod 70. Collar 75 has a large bearing surface and, therefore, will not mar the surface of rod 70. Furthermore, the twisting action of screw 76 is exerted upon the exterior surface of collar 75, and, therefore, does not mar the rod 70.

The end of the rod 70 projects below the head 65 through the aligned bearing guides and presents a reduced stub shaft 78, best seen in FIGURE 7, directed toward the top of cross table 35. Thus, a shoulder 79 is created.

A cylinder 81, having an air vent 82, is slidable unto the stub shaft 78. Air vent 82 is provided in order to prevent air entrapment to frustrate the effort to install cylinder 81 upon the shaft 78.

An O ring 83 is carried by the stub shaft 78 and encompasses the stub shaft. The cylinder 81 is closely fitted to the exterior surface of the stub shaft 78 and the resilient nature of the O ring 83 form a friction grip. Hence, the top of the cylindrical portion 81 will abut the shoulder 79 as a stop, but resistance against falling from the end of shaft 70 by gravity is achieved through the frictional grip.

A probe point 84 is carried on the end of the cylindrical portion 81 and is employed as the reference device which establishes the measuring point on any workpiece. The cylindrical portion 81 may be removed and other similar probe devices installed if a point other than the probe point 84 is desired.

In operation, therefore, a workpiece is attached to the top surface of cross table 35 by means of holding devices fitted into grooves 85, as shown in FIGURE 3. This manner of attachment of workpieces is common and well-known in machine shop practice.

Once a workpiece is placed in a desired location, and a starting position is determined, the gauges 47 and 47A may be read and recorded, or preferably set to a zero reading condition. Thereafter, the combination tables are moved to place another point of the workpiece under the probe point 84 and the measurement of the two instruments 47 and 47A will then determine the coordinate relationship of the major position from the starting position.

Conversely, if it is desired to establish a measured position from specifications, the tables are moved until the gauges 47 and 47A are to a position indicating the proper coordinate movement, and then the probe point is lowered to engage the workpiece and record the established new position.

While the instant invention has been shown and described herein in what is conceived to be the most practical and preferred embodiments, it is recognized that departures may be made therefrom within the scope of the invention which is therefore not to be limited to the details disclosed herein, but it to be afforded the full scope of the invention as hereinafter claimed.

What is claimed is:

1. A positioning table comprising:

base means having first and second spaced parallel rails, said first rail being substantially cylindrical in cross section, and said second rail being undercut longitudinally to provide an undercut channel;

a first carriage mounted to reciprocate along said rails and having first bearing means engaging said first rail and second bearing means engaging said second rail;

said first bearing means partially encircling said first rail, said first bearing means having means to substantially prevent any relative displacement between said first carriage and said base except along the length of said first rail;

said second bearing means riding on the top of said second rail and hook means extending into said channel to prevent lifting of said first carriage away from said second rail;

said second bearing means serving only to provide low friction support for said carriage on said second rail and providing a degree of movement of said second bearing means laterally with respect to said first and second rail, confined only by the limited inhibition provided by said hook means;

said first carriage carrying thereon third and fourth spaced parallel rails extending in a direction traversing said first and second rails, said third rail being substantially cylindrical in cross section and said fourth rail being undercut longitudinally to provide a channel, a second carriage adapted to hold a workpiece and mounted to reciprocate on said third and fourth rails and having third bearing means engaging said third rail and fourth bearing means engaging said fourth rail;

said third bearing means partially encircling said third rail to substantially prevent any relative displacement between said second carriage and said base except along the length of said third rail;

said fourth bearing means riding on the top of said fourth rail and including hook means extending loosely into said fourth rail channel to prevent lifting of said second carriage away from said fourth rail;

said fourth bearing means serving only to provide low friction support for said second carriage on said fourth rail and permitting freedom of lateral movement of said fourth bearing means with respect to said fourth rail except for the limited inhibition provided by said fourth bearing hook means;

a post upstanding from said base;

an arm mounted to said post and adjustable vertically thereon, said arm having an extended end;

a housing carried on the end of said arm remote from said post, first and second bearing portions aligned in said housing and providing a guide bearing having a vertical through opening, said bearing portions being separated by a space and a ring positioned in said space between said bearing portions and encompassing said vertical through opening established thereby, said ring having an inside diameter larger than the diameter of the through opening established by said bearing portions;

a probe rod having an outside dimension closely fitted to said bearing portions and guided thereby for movement confined solely to the longitudinal axis of said rod, said rod having a service portion and projecting below said housing, a reduced size stub shaft extending from said service portion end and axially aligned with said probe rod, thereby establishing an outwardly-extending shoulder between said rod and service portion;

an interchangeable probe including a cylindrical member closely fitted and telescoped over said stub shaft in abutment with said shoulder and a probe point member carried by the lower end of said cylindrical member;

one of said shaft and cylinder members having therein a groove facing the other of said members, and having a pliant packing in said groove extending partially therefrom into frictional engagement with the other of said members, said frictional engagement and closeness of fit being sufficient to retain the interchangeable probe upon said stub shaft; and means to drive said ring laterally with respect to said probe rod for producing a frictional holding of the probe rod in vertical adjustment.

2. Positioning table comprising:

an anchor rail rod of uniform cross-section throughout the length thereof;

a standard rail to support said rod, said standard rail having a bifurcated trough top producing two opposed top edges, said rod seated in contact with only said top edges;

a plurality of anchor bolts extending upwardly through said rail and threadably engaged into said rod, said bolts pulling said rod into tight engagement on said rail and thereby establishing said rod to a fixed course;

bearing truck means substantially encircling said rod for movement solely in the path established thereby;

a table carriage fixedly mounted on said bearing truck and extending laterally therefrom;

support carriage means providing a non-fixed support of said table carriage at a distance from said rail rod;

an upstanding post fixed with respect to said rail rod;

an overarm mounted to said post and adjustable vertically thereon;

a housing carried on the end of said overarm remote from said post, first and second bearing portions aligned in said housing and providing a guide bearing having a vertical through opening, said bearing portion being separated by a space and a ring positioned in said space between said bearing portions, and encompassing the said vertical through opening established thereby, said ring having an inside diameter larger than the diameter of the through opening established by said bearing portions;

a probe rod having an outside dimension closely fitted to said bearing portions and guided thereby for movement confined solely to the longitudinal axis of said rod, said rod having a service portion and projecting below said housing, a reduced size stub shaft extending from said service portion end and axially aligned with the probe rod, thereby establishing an outwardly-extending shoulder between said rod and service portion;

an interchangeable probe including a cylindrical member closely fitted and telescoped over said stub shaft and in abutment with said shoulder and a probe point member carried by the lower end of said cylindrical member;

one of said shaft and cylindrical members having therein a groove facing the other of said members, and having a pliant packing in said groove extending partially therefrom into frictional engagement with the other of said members, said frictional engagement and closeness of fit being sufficient to retain the interchangeable probe upon the said stub shaft; and means to drive said ring laterally with respect to said probe rod for producing a frictional holding of the probe rod in vertical adjustment.

3. Positioning table comprising:

a first anchor rail rod of uniform cross-section throughout the length thereof;

a first standard rail to support said first rod, said first standard rail having a bifurcated trough top producing two opposed top edges, said first rod seated in contact with only said top edges;

a plurality of anchor bolts extending upwardly through said first standard rail and threadably engaged into said first rod, said bolts pulling said first rod into tight engagement on said first standard rail and thereby establishing said first rod to a fixed course;

bearing truck means substantially encircling said first rod for movement solely in the path established thereby;

a table carriage fixedly mounted on said bearing truck means and extending laterally therefrom;

support carriage means providing a non-fixed support of said table carriage at a distance from said first rod;

a second standard rail mounted on said table carried in a fixed course laterally of said fixed course of said first anchor rail rod, said second standard rail having a bifurcated trough top producing two opposed top edges, a second anchor rail rod secured in contact with said second standard rail and having a plurality of anchor bolt means extending upwardly through said table carriage and second standard rail and threadably engaged into said second rod for pulling said second rod into tight engagement on said second rail and thereby establishing said second rod to a fixed course laterally of the fixed course of said first anchor rail rod;

truck bearing means substantially encircling said second anchor rail rod for movement solely in the path established thereby;

a cross-table carriage fixedly mounted on said truck bearing and extending laterally therefrom;

carriage support means providing a non-fixed support of said cross-table carriage upon the top surface of said table carriage at a distance from said second anchor rail rod;

an upstanding post fixed with respect to said first rail rod;

an overarm mounted to said post and adjustable vertically thereon;

a housing carried on the end of said overarm remote from said post, first and second bearing portions aligned in said housing and providing a guide bearing having a vertical through opening, said bearing portions being separated by a space and a ring positioned in said space between the said bearing portions and encompassing the said vertical through opening establishing thereby, said ring having an inside diameter larger than the diameter of the through opening established by said bearing portions;

a probe rod having an outside dimension closely fitted to said bearing portions and guided thereby for movement confined solely to the longitudinal axis of said rod, said rod having a service portion and projecting below said housing, a reduced size stub shaft extending from said service portion end and axially aligned with the probe rod, thereby establishing an outwardly-extending shoulder between said rod and service portion;

an interchangeable probe including a cylindrical member closely fitted and telescoped over said stub shaft and in abutment with said shoulder and a probe point member carried by the lower end of said cylindrical member;

one of said shaft and cylindrical members having therein a groove facing the other of said members, and having a pliant packing in said groove extending partially therefrom into frictional engagement with the other of said members, said frictional engagement and closeness of fit being sufficient to retain the interchangeable probe upon the said stub shaft; and means to drive said ring laterally with respect to said probe rod for producing a frictional holding of the probe rod in vertical adjustment.

4. Positioning table comprising:

a first anchor rail rod of uniform cross-section throughout the length thereof;

a first standard rail to support said first rod, said first standard rail having a bifurcated trough top producing two opposed top edges, said first rod seated in contact with only said top edges;

a plurality of anchor bolts extending upwardly through said first standard rail and threadably engaged into said first rod, said bolts pulling said first rod into tight engagement on said rail and thereby establishing said first rod to a fixed course;

bearing truck means substantially encircling said first rod for movement solely in the path established thereby;

a table carriage fixedly mounted on said bearing truck and extending laterally therefrom;

support carriage means providing a non-fixed support of said table carriage at a distance from said first anchor rail rod;

a second standard rail mounted on said table carriage in a fixed course laterally of said fixed course of the first anchor rail rod, said second standard rail having a bifurcated trough top producing two opposed top edges, a second anchor rod secured in contact with said second standard rail and having a plurality of anchor bolt means extending upwardly through said table carriage and second standard rail and threadably engaged into said second rod for pulling said second rod into tight engagement on said second standard rail and thereby establishing said second rod to a fixed course laterally of the fixed course of said first anchor rail rod;

truck bearing means substantially encircling said second anchor rail rod for movement solely in the path established thereby;

a cross-table carriage fixedly mounted on said truck bearing and extending laterally therefrom;

carriage support means providing a non-fixed support of said cross-table carriage upon the top surface of said table carriage at a distance from said second anchor rail rod;

an upstanding post fixed with respect to said first rail rod;

an overarm mounted to said post and adjustable vertically thereon;

a housing carried on the end of said overarm remote from said post, first and second bearing portions aligned in said housing and providing a guide bearing having a vertical through opening, said bearing portions being separated by a space and a ring positioned in said space between the said bearing portions and encompassing the said vertical through opening established thereby, said ring having an inside diameter larger than the diameter of the through opening established by said bearing portions;

a probe rod having an outside dimension closely fitted to said bearing portions and guided thereby for movement confined solely to the longitudinal axis of said rod, said rod having a service portion and projecting below said housing, a reduced size stub shaft extending from said service portion end and axially aligned with the probe rod, thereby establishing an outwardly-extending shoulder between said rod and service portion;

an interchangeable probe including a cylindrical member closely fitted and telescoped over said stub shaft and in abutment with said shoulder and a probe point member carried by the lower end of said cylindrical member;

one of said shaft and cylindrical members having therein a groove facing the other of said members, and having a pliant packing in said groove extending partially therefrom into frictional engagement and closeness of fit being sufficient to retain the interchangeable probe upon the said stub shaft;

means to drive said ring laterally with respect to said probe rod for producing a frictional holding of the probe rod in vertical adjustment; and at least one table carriage having a position lock pin, bearing guide means carried by said one table carriage, said lock pin mounted in said guide means for movement in a direction transverse to said rail and on a course to contact therewith, and means to hold said pin in a selected position of contact with said rail, and degree of pressure therewith.

5. Positioning table comprising:

base means having first and second spaced parallel rails;

said first rail having a first anchor rail rod of uniform cross-section throughout the length thereof extending along said first rail in a fixed course;

truck means having interlocking surface means with said first anchor rail rod for movement solely in the path established thereby, a table carriage mounted on said truck means;

truck means supporting said table carriage on said second rail;

anchor means having interlocking surface means with said second rail and engaging said table to said second rail for movement solely in the plane of said second rail;

two spaced parallel additional rails substantially as provided on said base being mounted on the said table carriage, a cross-slide table mounted on said second set of rails for movement laterally with respect to said rails on the base means, said two spaced parallel additional rails and cross-slide table formed and functioning substantially as defined with respect to the rails and table carriage on said base means;

an upstanding post fixed with respect to said base means;

an overarm mounted to said post and adjustable vertically thereon;

a housing carried on the end of said overarm remote from said post, first and second bearing portions aligned in said housing and providing a guide bearing having a vertical through opening, said bearing portions being separated by a space and a ring positioned in said space between the said bearing portions and encompassing the said vertical through opening established thereby, said ring having an inside diameter larger than the diameter of the through opening established by said bearing portions;

a probe rod having an outside dimension closely fitted to said bearing portions and guided thereby for movement confined solely to the longitudinal axis of said rod, said rod having a service portion and projecting below said housing, a reduced size stub shaft extending from said service portion end and axially aligned with the probe rod, thereby establishing an outwardly-extending shoulder between said rod and service portion;

an interchangeable probe including a cylindrical member closely fitted and telescoped over said stub shaft and in abutment with said shoulder and a probe point member carried by the lower end of said cylindrical member;

one of said shaft and cylindrical members having therein a groove facing the other of said members, and having a pliant packing in said groove extending partially therefrom into frictional engagement with the other of said members, said frictional engagement and closeness of fit being sufficient to retain the interchangeable probe upon the said stub shaft; and means to drive said ring laterally with respect to said probe rod for producing a frictional holding of the probe rod in vertical adjustment.

6. Positioning table comprising:

a first anchor rail rod of uniform cross-section throughout the length thereof;

a first standard rail to support said first rod, said first standard rail having a bifurcated trough top producing two opposed top edges, said first rod seated in contact with only said top edges;

a plurality of anchor bolts extending upwardly through said first rail and threadably engaged into said first rod, said bolts pulling said first rod into tight engagement on said first rail and thereby establishing said first rod to a fixed course;

bearing truck means substantially encircling said first rod for movement solely in the path established thereby;

a table carriage fixedly mounted on said bearing truck and extending laterally therefrom;

a support carriage means providing a non-fixed support of said table carriage at a distance from said first rail rod;

a second standard rail mounted on said table carriage in a fixed course laterally of said fixed course of the first anchor rail rod, said second standard rail having a bifurcated trough top producing two opposed top edges, a second anchor rail rod secured in contact with said second standard rail and having a plurality of anchor bolt means extending upwardly through said table carriage and second standard rail and threadably engaged into said second rod for pulling said second rod to a fixed course laterally of the fixed course of said first anchor rail rod;

truck bearing means substantially encircling said second anchor rail rod for movement solely in the path established thereby;

a cross-table carriage fixedly mounted on said truck bearing and extending laterally therefrom;

carriage support means providing a non-fixed support of said cross-table carriage upon the top surface of said table carriage at a distance from said second anchor rail rod;

an upstanding post fixed with respect to said first rail rod;

an overarm mounted to said post and adjustable vertically thereon;

at least one table carriage having a position lock pin, bearing guide means carried by said one table carriage, said lock pin mounted in said guide means for movement in a direction transverse to said rail and on a course to contact therewith, and means to hold said pin in a selected position of contact with said rail, and degree of pressure therewith;

a housing carried on the end of said overarm remote from said post, first and second bearing portions aligned in said housing and providing a guide bearing having a vertical through opening, said bearing portions being separated by a space and a ring positioned in said space between the said bearing portions and encompassing the said vertical through opening established thereby, said ring having an inside diameter larger than the diameter of the through opening established by said bearing portions;

a probe rod having an outside dimension closely fitted to said bearing portions and guided thereby for movement confined solely to the longitudinal axis of said rod, said rod having a service portion and projecting below said housing, a reduced size stub shaft extending from said service portion end and axially aligned with the probe rod, thereby establishing an outwardly-extending shoulder between said rod and service portion;

an interchangeable probe including a cylindrical member closely fitted and telescoped over said stub shaft and in abutment with said shoulder and a probe point member carried by the lower end of said cylindrical member;

one of said shaft and cylindrical members having therein a groove facing the other of said members, and having a pliant packing in said groove extending partially therefrom into frictional engagement with the other of said members, said frictional engagement and closeness of fit being sufficient to retain the interchangeable probe upon the said stub shaft; and means to drive said ring laterally with respect to said probe rod for producing a frictional holding of the probe rod in vertical adjustment.

7. In a positioning table assembly which comprises an upstanding post, and an overarm mounted to said post, the combination of:

a housing carried on the end of said overarm remote from said post, first and second bearing portions aligned in said housing and providing a guide bearing having a vertical through opening, said bearing portions being separated by a space and a ring positioned in said space between the said bearing portions and encompassing the said vertical through opening established thereby, said ring having an inside diameter larger than the diameter of the through opening established by said bearing portions;

a probe rod having an outside dimension closely fitted to said bearing portions and guided thereby for movement confined solely to the longitudinal axis of said rod, said rod having a service portion and projecting below said housing, a reduced size stub shaft extending from said service portion end and axially aligned with the probe rod, thereby establishing an outwardly extending shoulder between said rod and service portion;

an interchangeable probe including a cylindrical member closely fitted and telescoped over said stub shaft and in abutment with said shoulder and a probe point member carried by the lower end of said cylindrical member;

one of said shaft and cylindrical members having therein a groove facing the other of said members, and having a pliant packing in said groove extending partially therefrom into frictional engagement with the other of said members, said frictional engagement and closeness of fit being sufficient to retain the interchangeable probe upon the said stub shaft; and means to drive said ring laterally with respect to said probe rod for producing a frictional holding of the probe rod in vertical adjustment.

References Cited
UNITED STATES PATENTS

| | | | |
|---|---|---|---|
| 2,601,330 | 6/1952 | Schmidt | 33—189 |
| 2,674,809 | 4/1954 | Russa | 33—169 |
| 2,757,457 | 8/1956 | Ziegelski | 33—189 |
| 2,760,258 | 8/1956 | Rieger | 287—135 |
| 2,888,284 | 5/1959 | Holmberg | 287—58 |
| 3,108,381 | 10/1963 | Kuebler | 33—189 |
| 3,279,073 | 10/1966 | Ardito et al. | 33—79 |
| 3,286,353 | 11/1966 | Potter | 33—174 |

FOREIGN PATENTS

| | | |
|---|---|---|
| 80,417 | 7/1868 | New Zealand. |
| 564 | 2/1879 | Great Britain. |

OTHER REFERENCES

"American Machinist" Feb. 13, 1935, 33–164, p. 182, Inside Micrometer for Measuring a Recess-Betz.

LEONARD FORMAN, *Primary Examiner.*

R. A. FIELDS, *Assistant Examiner.*